US006320702B1

(12) United States Patent
Yonezawa

(10) Patent No.: US 6,320,702 B1
(45) Date of Patent: Nov. 20, 2001

(54) AFOCAL ZOOM LENS, AND MICROSCOPE HAVING THE LENS

(75) Inventor: Yasuo Yonezawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/716,249

(22) Filed: Nov. 21, 2000

(30) Foreign Application Priority Data

Nov. 24, 1999 (JP) .................................................. 11-333154

(51) Int. Cl.[7] .......................... G02B 15/14; G02B 21/02; G02B 13/00; G02B 21/22
(52) U.S. Cl. ........................ 359/686; 359/660; 359/744; 359/376; 359/380
(58) Field of Search ................................. 359/660, 684, 359/686, 744, 773, 376, 380

(56) References Cited

U.S. PATENT DOCUMENTS

| | | | |
|---|---|---|---|
| 4,345,822 | * | 8/1982 | Tachihara .............................. 359/686 |
| 4,666,258 | * | 5/1987 | Kimura ................................. 359/686 |
| 4,752,121 | * | 6/1988 | Kitagishi .............................. 359/687 |
| 6,157,495 | * | 12/2000 | Kawasaki .............................. 359/686 |

FOREIGN PATENT DOCUMENTS

| | | | |
|---|---|---|---|
| 59-38651 | 9/1985 | (JP) . | |
| 58-228484 | 6/1995 | (JP) . | |
| 6-184222-A | * | 9/1985 | (JP) ..................................... 359/744 |

* cited by examiner

*Primary Examiner*—Evelyn A Lester
(74) *Attorney, Agent, or Firm*—Miles & Stockbridge P.C.

(57) ABSTRACT

An afocal zoom lens comprising, in order from an object side, a first lens group having a positive refractive power, a second lens group having a negative refractive power, a third lens group having a positive refractive power and a fourth lens group having a negative refractive power; the second lens group being movable in a fixed direction from the object side to an image side and the third lens group being movable in a fixed direction from the image side to the object side at the time of the zooming of from the low magnification end state to the high magnification end state. The afocal zoom lens fulfills specific conditions. The afocal zoom lens has a zoom ratio of 14 magnifications or higher and has a good optical performance. Also disclosed is a microscope having such a lens.

9 Claims, 7 Drawing Sheets

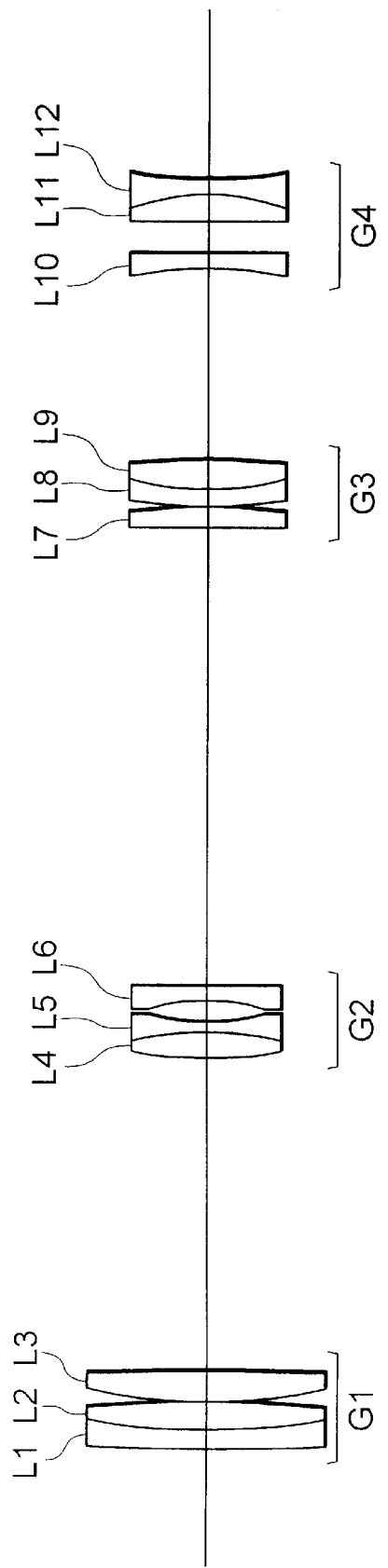

AFOCAL ZOOM LENS, AND MICROSCOPE HAVING THE LENS

This application claims the benefit of Japanese Application No. 11-333154, which is hereby incorporated by reference.

BACKGROUND OF THE INVENTION

1. Field of the invention

This invention relates to an afocal zoom lens, and more particularly to an afocal zoom lens suited for a microscope.

2. Related Background Art

As afocal zoom lenses used in microscopes or the like, lenses are conventionally known which are disclosed in, e.g., Japanese Patent Publications No. 6-48328 and No. 6-77104.

In recent years, in the field of microscopes, in particular, stereomicroscopes, target specimens to be observed have become rich in variety. Accordingly, it is sought to achieve a zoom ratio much higher than ever. None of conventional afocal zoom lenses, however, have any satisfactory zoom ratio and hence have a problem that any observation well satisfactory to user's demands can not be made.

SUMMARY OF THE INVENTION

The present invention was made taking account of the above problem. Accordingly, an object of the present invention is to provide an afocal zoom lens having a zoom ratio of 14 magnifications or higher and having a good optical performance, and to provide a microscope having such a lens.

To achieve the above object, the present invention provides an afocal zoom lens comprising, in order from an object side, a first lens group having a positive refractive power, a second lens group having a negative refractive power, a third lens group having a positive refractive power and a fourth lens group having a negative refractive power;

the second lens group being movable in a fixed direction from the object side to an image side and the third lens group being movable in a fixed direction from the image side to the object side at the time of the zooming of from the low magnification end state to the high magnification end state, and the afocal zoom lens fulfilling the conditions of:

$$z > 14 \quad (1)$$

$$|f1/f2| > 3.9 \quad (2)$$

wherein z represents a zoom ratio of the afocal zoom lens; f1 represents a focal length of the first lens group; and f2 represents a focal length of the second lens group.

The present invention also provides a microscope comprising an objective lens system, the afocal zoom lens described above and an imaging lens system.

BRIEF DESCRIPTION OF THE DRAWINGS

FIG. 2 illustrates the lens construction of afocal zoom lenses according to first to third embodiments.

DESCRIPTION OF THE PREFERRED EMBODIMENTS

Figure 1A:
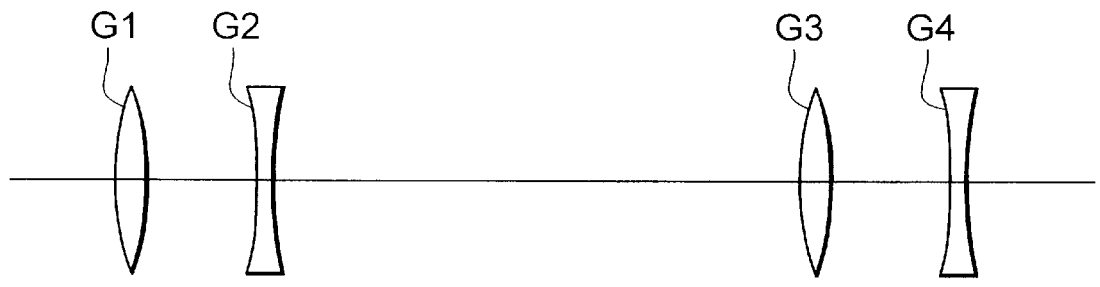
FIGS. 1A and 1B illustrate the basic construction of the afocal zoom lens according to the present invention, and a zoom movement locus.

The afocal zoom lens according to the present invention has a four-group construction of positive, negative, positive and negative, i.e., a first lens group having a positive refractive power, a second lens group having a negative refractive power, a third lens group having a positive refractive power and a fourth lens group having a negative refractive power, in order from an object side. At the time of the zooming of from the low magnification end state to the high magnification end state, the second lens group is movable in a fixed direction from the object side to an image side and the third lens group is movable in a fixed direction from the image side to the object side. More specifically, the second and third lens groups are movable always only in a fixed direction, and are not movable in the direction they go backward in the course of zooming (zooming operation). This construction is a basic construction for materializing an afocal zoom lens having a zoom ratio of 14 magnifications or higher as represented by condition (1): z>14.

The afocal zoom lens according to the present invention also fulfills condition (2): |f1/f2|>3.9 (wherein z represents a zoom ratio of the afocal zoom lens; f1 represents a focal length of the first lens group; and f2 represents a focal length of the second lens group), which specifies an appropriate ratio of focal length between the first lens group and the second lens group. Such a condition is a condition necessary for materializing the afocal zoom lens having a zoom ratio of 14 magnifications or higher. If it has a value lower than the lower-limit value of the condition (2), the zoom ratio of 14 magnifications or higher can not be achieved. If in such a condition it is attempted to enhance the zoom ratio forcibly, the third lens group may require a tight power to make it difficult to correct any aberrations at the time of zooming.

The afocal zoom lens of the present invention may preferably fulfill the following condition (3).

$$3 < |z/(f1/f2)| < 5 \quad (3)$$

The condition (3) specifies an optimum ratio of focal length between the first lens group and the second lens group for the achievement of the desired zoom ratio of 14 magnifications or higher. If the afocal zoom lens has a value higher than the lower-limit value of the condition (3), the zoom lens has a too large whole length with respect to the proportion of zoom ratio, undesirably. If on the other hand it has a value higher than the upper-limit value of the condition (3), a short interval (air gap) between the first lens group and the second lens group may result when the desired zoom ratio is to be attained, to cause an interference between the first lens group and the second lens group on the low-magnification side.

In the present invention, the first lens group may preferably have at least a positive cemented lens and a positive meniscus lens. This construction enables easy correction of spherical aberration especially on the high-magnification side of the zoom lens.

In the present invention, the fourth lens group may preferably have, in order from an object side, a negative lens and a cemented lens with its concave surface facing the image side. This construction enables easy correction of astigmatism and field curvature over the whole zooming region.

Embodiments of the present invention will be described below with reference to the accompanying drawings.

Figure 1B:
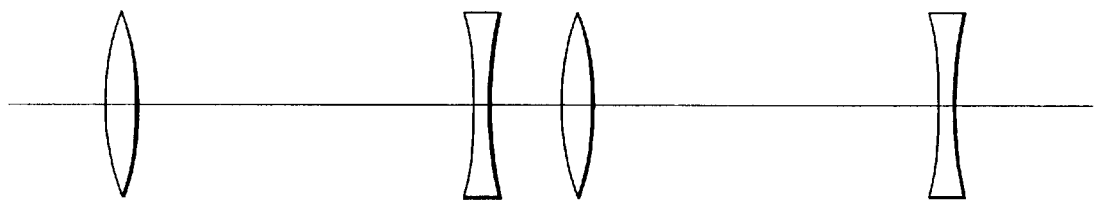

FIGS. 1A and 1B illustrate the basic construction of the afocal zoom lens according to the present invention. It comprises, in order from an object side, a first lens group G1 having a positive refractive power, a second lens group G2 having a negative refractive power, a third lens group G3 having a positive refractive power and a fourth lens group G4 having a negative refractive power. Then, at the time of the zooming of from the low magnification end state (FIG. 1A) to the high magnification end state (FIG. 1B), the second lens group G2 is moved in a fixed direction from the object side to an image side and the third lens group G3 is moved in a fixed direction from the image side to the object side.

FIG. 2 illustrates the lens construction of afocal zoom lenses according to first to third embodiments. Each zoom lens comprises, in order from an object side, a first lens group G1 having a positive refractive power, a second lens group G2 having a negative refractive power, a third lens group G3 having a positive refractive power and a fourth lens group G4 having a negative refractive power. The first lens group G1 has cemented lenses L1 and L2 and a positive meniscus lens, and the fourth lens group G4 has a negative lens L10 and a cemented lens consisting of lenses L11 and L12a, with its concave surface facing the image side.

(First Embodiment)

Factorial values of an afocal zoom lens according to a first embodiment are shown in Table 1 below. In Table 1, f represents a synthesized focal length of the afocal zoom lens and an imaging lens shown in Table 4; and z represents a zoom ratio. The factorial values shown below are those which are so normalized that the focal length in the low magnification end state comes to be 1. Also, numbers given at the left end of the data represent the order of lens surfaces counted from the object surface r represents a radius of curvature of a lens surface; d represents an interval (air gap) between the lens surfaces; and vd and nd, an Abbe number and an refractive index, respectively, with respect to the d-line ($\lambda$=587.56 nm). Still also, units of length, radius of curvature and so forth are mm. In factorial values in all Embodiments given below, the same letter symbols as those in the present embodiment are used and also so standardized that the focal length in the low magnification end state comes to be 1.

TABLE 1

(Whole factors)
f = 1 ~ 15
z = 15
(Lens data)

| | r | d | vd | nd |
|---|---|---|---|---|
| 1 | 2.0446 | 0.0317 | 31.62 | 1.756920 |
| 2 | 0.8647 | 0.0433 | 82.52 | 1.497820 |
| 3 | -4.4054 | 0.0033 | | 1.000000 |
| 4 | 0.7334 | 0.0417 | 82.52 | 1.497820 |
| 5 | 4.4990 | d1 | | 1.000000 |
| 6 | 0.5963 | 0.0417 | 23.82 | 1.846660 |
| 7 | -0.6547 | 0.0167 | 57.36 | 1.670000 |
| 8 | 0.2896 | 0.0333 | | 1.000000 |
| 9 | -0.4185 | 0.0233 | 35.72 | 1.902650 |
| 10 | 2.3083 | d2 | | 1.000000 |
| 11 | 2.7586 | 0.0333 | 60.68 | 1.603110 |
| 12 | -1.2341 | 0.0033 | | 1.000000 |
| 13 | 0.8722 | 0.0250 | 27.51 | 1.755200 |
| 14 | 0.3979 | 0.0500 | 68.33 | 1.592400 |
| 15 | -1.6659 | d3 | | 1.000000 |
| 16 | -0.7883 | 0.0250 | 35.29 | 1.749500 |
| 17 | 18.8294 | 0.0500 | | 1.000000 |
| 18 | 7.6728 | 0.0417 | 23.82 | 1.846660 |
| 19 | -0.4489 | 0.0250 | 36.26 | 1.620040 |
| 20 | 0.8832 | | | 1.000000 |

(Data of variable intervals)

d1 = 0.03784 ~ 0.70045
d2 = 1.46377 ~ 0.07871
d3 = 0.03141 ~ 0.75386

(Condition-corresponding values)

| f1/f2 | = 4
| z/(f1/f2) | = 3.75

Figure 3A:
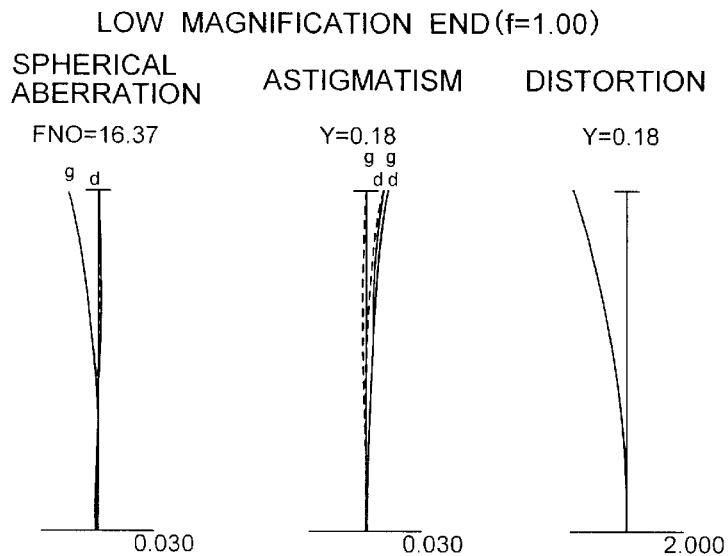
FIGS. 3A to 3C are diagrams showing various aberrations of an afocal zoom lens according to the first embodiment, in a low magnification end state (FIG. 3A), a middle magnification end state (FIG. 3B) and a high magnification end state (FIG. 3C).
Figure 3B:
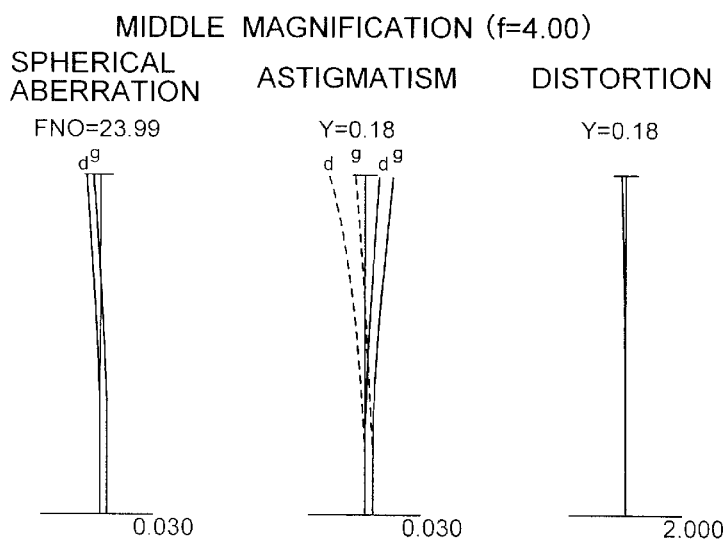
Figure 3C:
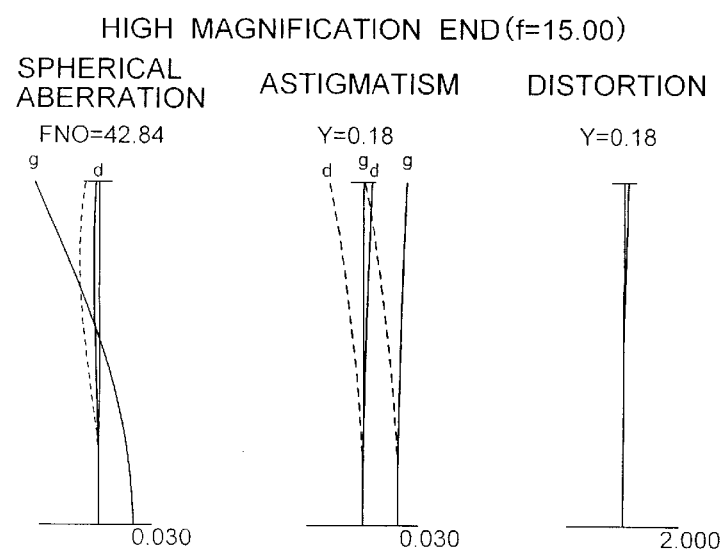

FIGS. 3A to 3C are diagrams showing various aberrations occurring when the afocal zoom lens according to the present embodiment and the imaging lens shown in Table 4 are used. FIG. 3A shows aberrations in a low magnification end state; FIG. 3B shows aberrations in a middle magnification state; and FIG. 3C shows aberrations in a high magnification end state. Also, in the diagram showing distortion, solid lines indicate a sagittal image surface; and broken lines indicate a meridional image surface. In aberration diagrams in all Embodiments given below, the same letter symbols as those in the present embodiment are used. As can be seen from the drawings, in the present embodiment, the afocal zoom lens has a superior optical performance that various aberrations have well been corrected over the range of from the low magnification end state to the high magnification end state.

(Second Embodiment)

Factorial values of an afocal zoom lens according to a second embodiment are shown in Table 2 below.

TABLE 2

(Whole factors)
f = 1 ~ 18.3
z = 18.3
(Lens data)

| | r | d | vd | nd |
|---|---|---|---|---|
| 1 | 2.0063 | 0.0317 | 31.62 | 1.756920 |
| 2 | 0.9657 | 0.0433 | 82.52 | 1.497820 |
| 3 | -3.5103 | 0.0033 | | 1.000000 |
| 4 | 0.7616 | 0.0417 | 82.52 | 1.497820 |
| 5 | 1.6809 | d1 | | 1.000000 |

TABLE 2-continued (Whole factors)
f = 1 ~ 18.3
z = 18.3
(Lens data)

|    | r       | d      | νd    | nd       |
|----|---------|--------|-------|----------|
| 6  | 0.5664  | 0.0417 | 23.82 | 1.846660 |
| 7  | -0.7192 | 0.0167 | 57.36 | 1.670000 |
| 8  | 0.2667  | 0.0333 |       | 1.000000 |
| 9  | -0.3924 | 0.0233 | 35.72 | 1.902650 |
| 10 | 7.9020  | d2     |       | 1.000000 |
| 11 | 91.3902 | 0.0333 | 60.68 | 1.603110 |
| 12 | -0.9107 | 0.0033 | 60.68 | 1.000000 |
| 13 | 0.5465  | 0.0250 | 27.51 | 1.755200 |
| 14 | 0.2851  | 0.0500 | 68.33 | 1.592400 |
| 15 | -1.4346 | d3     |       | 1.000000 |
| 16 | -0.6143 | 0.0250 | 35.29 | 1.749500 |
| 17 | 1.6535  | 0.0500 |       | 1.000000 |
| 18 | 4.1104  | 0.0417 | 23.82 | 1.846660 |
| 19 | -0.3196 | 0.0250 | 36.26 | 1.620040 |
| 20 | 0.7303  |        |       | 1.000000 |

(Data of variable intervals)

d1 = 0.04798 ~ 0.93879
d2 = 1.48026 ~ 0.05433
d3 = 0.06562 ~ 0.60073

(Condition-corresponding values)

| f1/f2 | = 4.9
| z/(f1/f2) | = 3.73

Figure 4A:
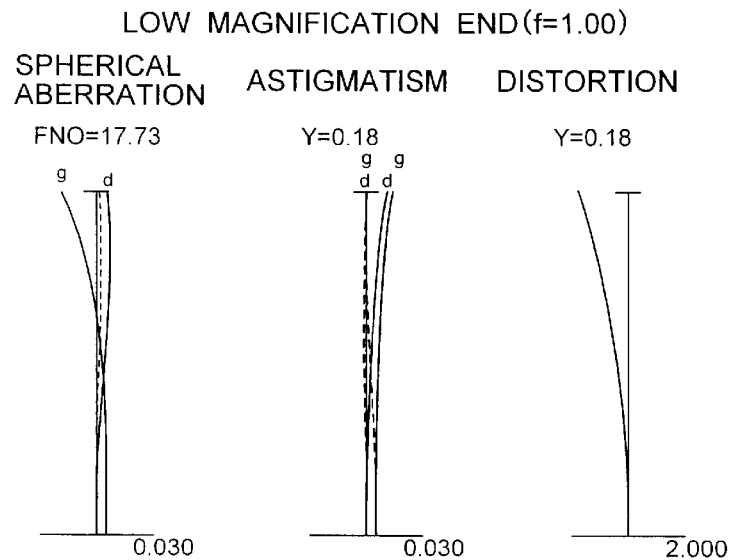
FIGS. 4A to 4C are diagrams showing various aberrations of an afocal zoom lens according to the second embodiment, in a low magnification end state (FIG. 4A), a middle magnification end state (FIG. 4B) and a high magnification end state (FIG. 4C).
Figure 4B:
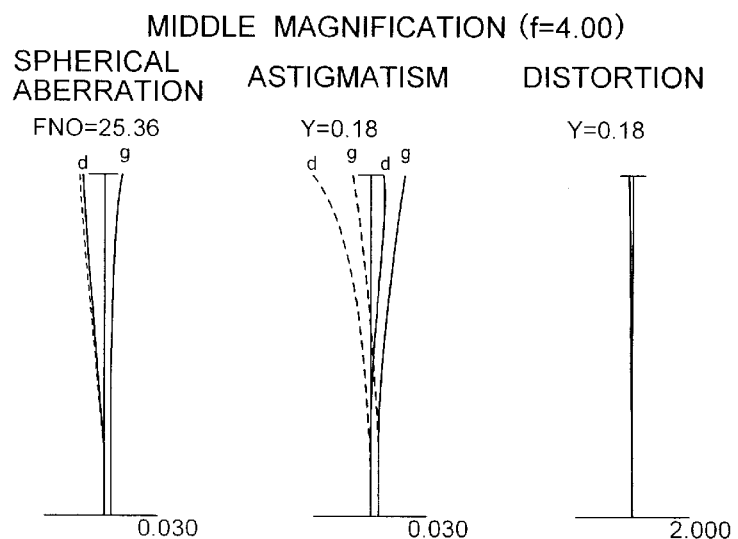
Figure 4C:
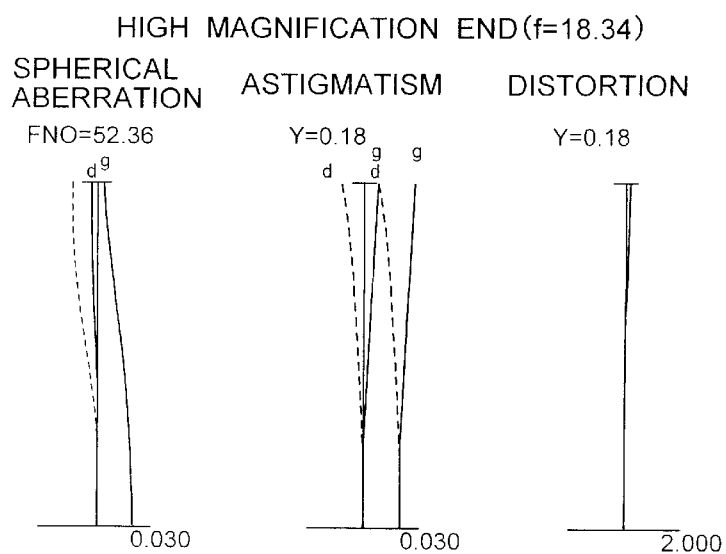

FIGS. 4A to 4C are diagrams showing various aberrations occurring when the afocal zoom lens according to the present embodiment and the imaging lens shown in Table 4 are used. FIG. 4A shows aberrations in a low magnification end state; FIG. 4B shows aberrations in a middle magnification state; and FIG. 4C shows aberrations in a high magnification end state. As can be seen from the drawings, in the present embodiment, the afocal zoom lens has a superior optical performance that various aberrations have well been corrected over the range of from the low magnification end state to the high magnification end state.

(Third Embodiment)

Factorial values of an afocal zoom lens according to a third embodiment are shown in Table 3 below.

TABLE 3

(Whole factors)
f = 1 ~ 25
z = 25
(Lens data)

|    | r       | d      | νd    | nd       |
|----|---------|--------|-------|----------|
| 1  | 2.0491  | 0.0317 | 31.62 | 1.756920 |
| 2  | 1.0880  | 0.0433 | 82.52 | 1.497820 |
| 3  | -5.2893 | 0.0033 |       | 1.000000 |
| 4  | 0.8982  | 0.0417 | 82.52 | 1.497820 |
| 5  | 1.7575  | d1     |       | 1.000000 |
| 6  | 0.5845  | 0.0417 | 23.82 | 1.846660 |
| 7  | -0.6708 | 0.0167 | 57.36 | 1.670000 |
| 8  | 0.2985  | 0.0333 |       | 1.000000 |
| 9  | -0.4248 | 0.0233 | 35.72 | 1.902650 |
| 10 | 1.7259  | d2     |       | 1.000000 |
| 11 | 5.7823  | 0.0333 | 60.68 | 1.603110 |
| 12 | -0.9007 | 0.0033 |       | 1.000000 |
| 13 | 0.4959  | 0.0250 | 27.51 | 1.755200 |
| 14 | 0.2637  | 0.0500 | 68.33 | 1.592400 |
| 15 | -1.7586 | d3     |       | 1.000000 |
| 16 | -0.4844 | 0.0250 | 35.29 | 1.749500 |
| 17 | 0.9672  | 0.0500 |       | 1.000000 |
| 18 | 6.3093  | 0.0417 | 23.82 | 1.846660 |
| 19 | -0.2415 | 0.0250 | 36.26 | 1.620040 |
| 20 | 0.6972  |        |       | 1.000000 |

(Data of variable intervals)

d1 = 0.09893 ~ 1.27111
d2 = 1.74488 ~ 0.07839
d3 = 0.13188 ~ 0.62619

(Condition-corresponding values)

| f1/f2 | = 6
| z/(f1/f2) | = 4.17

Figure 5A:
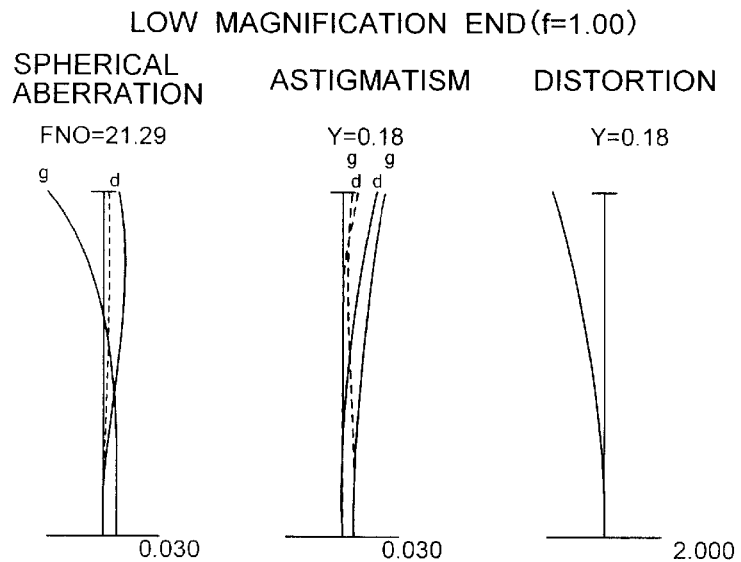
FIGS. 5A to 5C are diagrams showing various aberrations of an afocal zoom lens according to the third embodiment, in a low magnification end state (FIG. 5A), a middle magnification end state (FIG. 5B) and a high magnification end state (FIG. 5C).
Figure 5B:
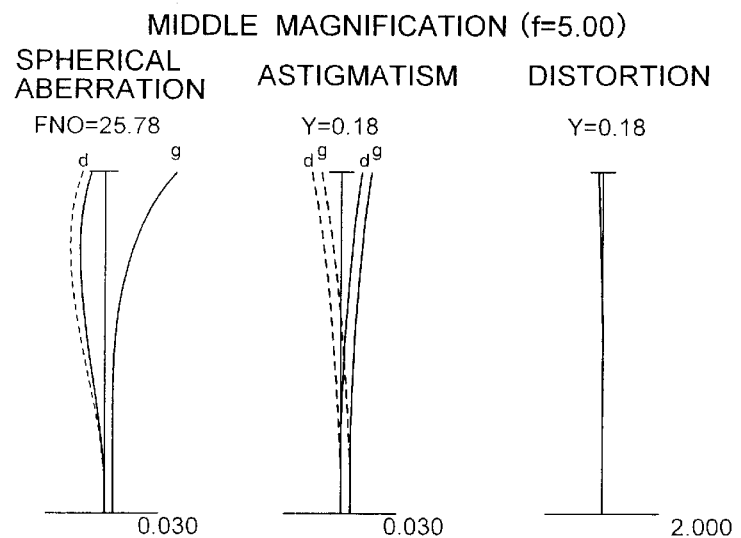
Figure 5C:
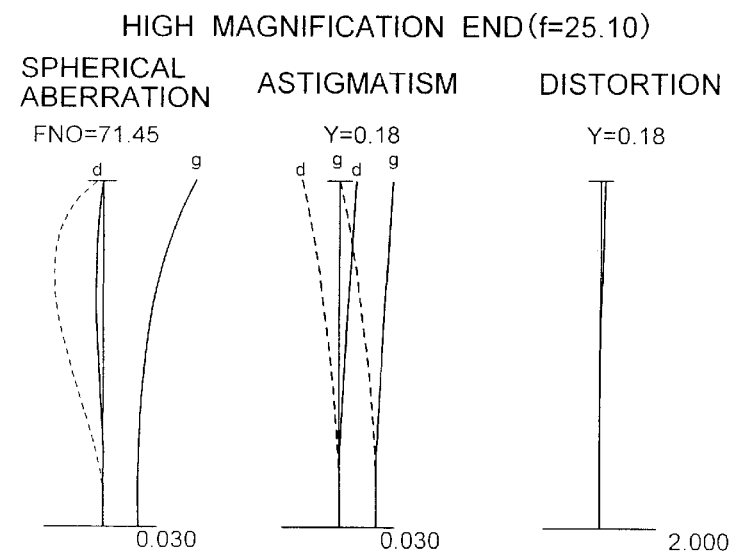

FIGS. 5A to 5C are diagrams showing various aberrations occurring when the afocal zoom lens according to the present embodiment and the imaging lens shown in Table 4 are used. FIG. 5A shows aberrations in a low magnification end state; FIG. 5B shows aberrations in a middle magnification state; and FIG. 5C shows aberrations in a high magnification end state. As can be seen from the drawings, in the present embodiment, the afocal zoom lens has a superior optical performance that various aberrations have well been corrected over the range of from the low magnification end state to the high magnification end state.

The afocal zoom lenses according to the above respective embodiments are of an infinite correction type, and hence, they are used in combination with an imaging lens whose factorial values are shown in Table 4 below.

TABLE 4

|   | r       | d      | νd    | nd       |
|---|---------|--------|-------|----------|
| 1 | 3.1703  | 0.0333 | 27.61 | 1.755200 |
| 2 | 1.7016  | 0.0500 | 67.87 | 1.593189 |
| 3 | -3.7548 |        |       | 1.000000 |

(Fourth Embodiment)

Figure 6:
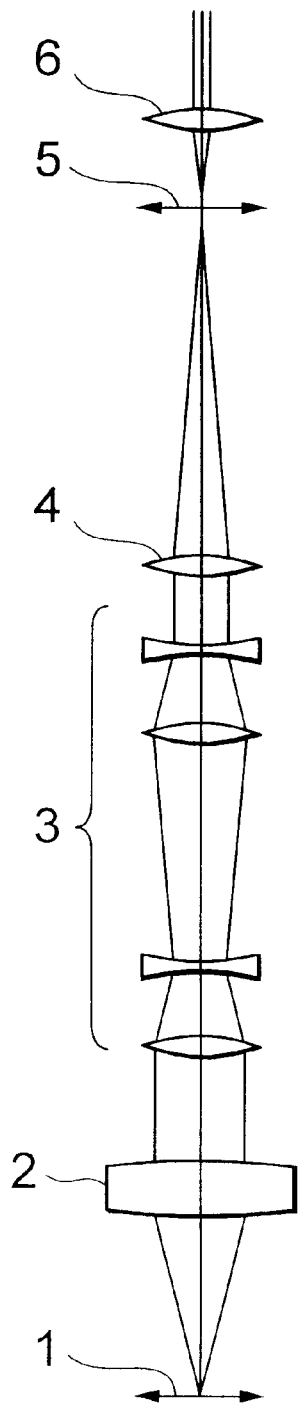
FIG. 6 illustrates the lens construction of a monocular microscope having the afocal zoom lens according to the present invention.

FIG. 6 illustrates the lens construction of a microscope according to a fourth embodiment. This microscope is a monocular microscope having the afocal zoom lens according to the present invention.

Light L from an object 1 is converted to parallel light through an objective lens system 2, and thereafter zoomed with an afocal zoom lens 3. Next, an image of the object is formed on an imaging plane 5 through an imaging lens 4. Then, this image is further enlarged through an eyepiece lens and is viewed by an observer (not shown). Since the zoom lens 3 is of an afocal system, the objective lens 2 or the imaging lens 4 may be changed for a lens system with a different focal length so that the magnifications of the whole system can be changed.

(Fifth Embodiment)

Figure 7:
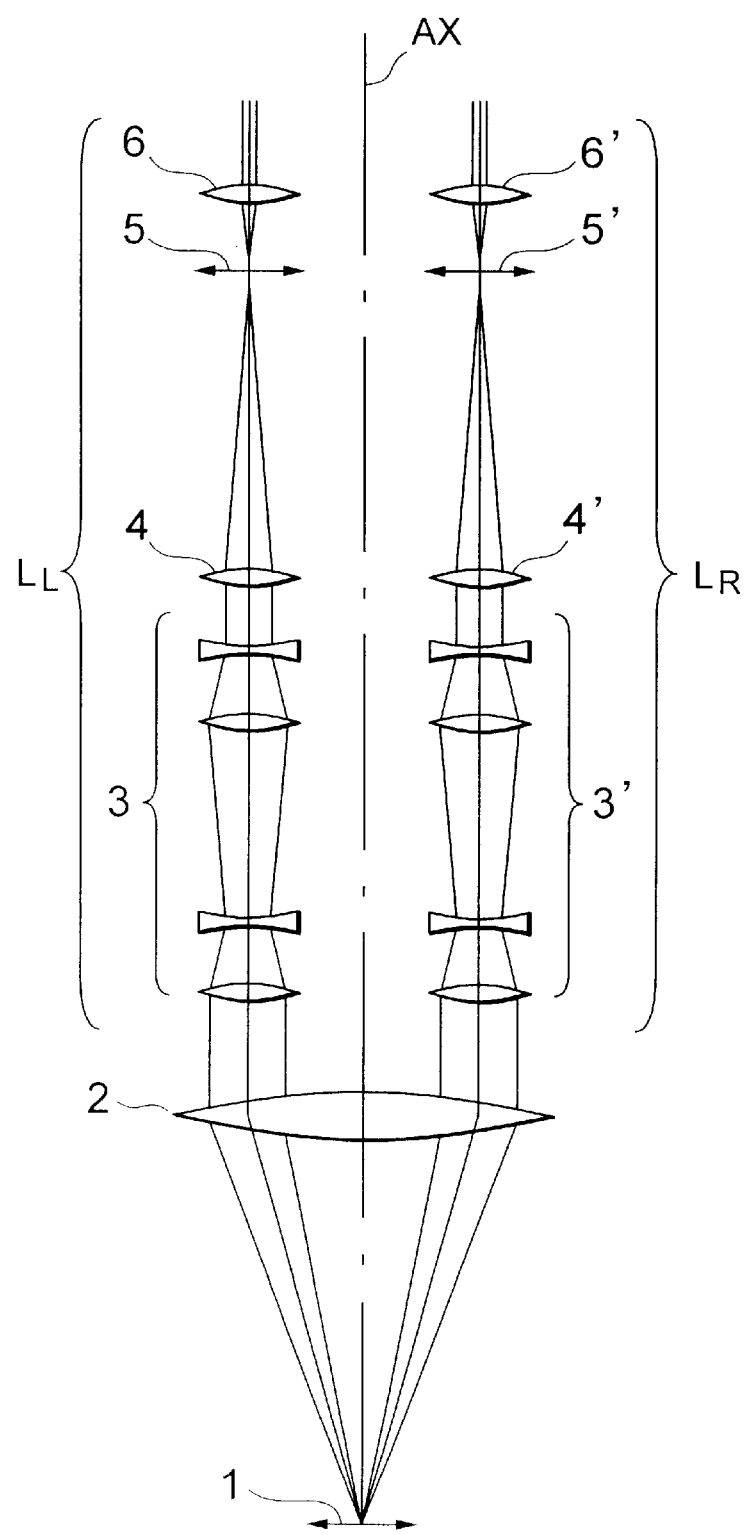
FIG. 7 illustrates the lens construction of a stereomicroscope having the afocal zoom lens according to the present invention.

FIG. 7 illustrates the lens construction of a microscope according to a fifth embodiment. This microscope is a stereomicroscope and has an observation optical system $L_L$ for the left eye and an observation optical system $L_R$ for the right eye which are provided in parallel to the light axis AX of the objective lens. Then, these observation optical systems each have the afocal zoom lens according to the present invention.

In the observation optical system $L_L$ for the left eye, light L from an object 1 is converted to parallel light through an objective lens system 2, and thereafter zoomed with an afocal zoom lens 3. Next, an image of the object is formed on an imaging plane 5 through an imaging lens 4. Then, this image is further enlarged through an eyepiece lens and is viewed by an observer (not shown) with the left eye. The observation optical system $L_R$ for the right eye also has the like construction, and has an objective lens 2, an afocal zoom lens 3', an imaging lens 4', an imaging plane 5' and an eyepiece lens 6'.

Since the zoom lenses 3 and 3' are of an afocal system, the objective lens 2 or the imaging lenses 4 and 4' may be changed for lens systems with a different focal length so that the magnifications of the whole system can be changed.

As described above, the present invention can provide an afocal zoom lens having a zoom ratio of 14 magnifications or higher and having a good optical performance, and can provide a microscope having such a lens.

What is claimed is:

1. An afocal zoom lens comprising, in order from an object side:

a first lens group having a positive refractive power;
a second lens group having a negative refractive power;
a third lens group having a positive refractive power; and
a fourth lens group having a negative refractive power;
said second lens group being movable in a fixed direction from the object side to an image side and said third lens group being movable in a fixed direction from the image side to the object side at the time of the zooming of from a low magnification end state to a high magnification end state, and said afocal zoom lens fulfilling the conditions of:

$$z>14 \tag{1}$$

$$|f1/f2|>3.9 \tag{2}$$

wherein z represents a zoom ratio of said afocal zoom lens; f1 represents a focal length of said first lens group; and f2 represents a focal length of said second lens group.

2. The afocal zoom lens according to claim 1, which further fulfills the condition of:

$$3<|z/(f1/f2)<5 \tag{3}$$

3. The afocal zoom lens according to claim 1 or 2, wherein said first lens group has at least a positive cemented lens and a positive meniscus lens.

4. The afocal zoom lens according to claim 1 or 2, wherein said fourth lens group has, in order from the object side, a negative lens and a cemented lens with its concave surface facing the image side.

5. A microscope comprising:

an objective lens system;
the afocal zoom lens according to claim 1 or 2; and
an imaging lens system.

6. The afocal zoom lens according to claim 3, wherein said fourth lens group has, in order from the object side, a negative lens and a cemented lens with its concave surface facing the image side.

7. A microscope comprising:

an objective lens system;
the afocal zoom lens according to claim 6; and
an imaging lens system.

8. A microscope comprising:

an objective lens system;
the afocal zoom lens according to claim 3; and
an imaging lens system.

9. A microscope comprising:

an objective lens system;
the afocal zoom lens according to claim 4; and
an imaging lens system.

* * * * *